United States Patent [19]

Alexeev et al.

[11] 3,979,322

[45] Sept. 7, 1976

[54] PHOSPHATE GLASS FOR LASER USE

[76] Inventors: Nikolai Efimovich Alexeev, ulitsa Gorkogo 8, korpus 1, kv. 21, Moscow; Igor Mikhailovich Buzhinsky, ulitsa Pervomaiskaya 5, kv. 46, Lytkarino Moskovskoi oblasti; Mark Efremovich Zhabotinsky, ulitsa Pogodinskaya 2/3, kv. 53, Moscow; Anatoly Andreevich Izyneev, ulitsa Vokzalnaya, 19, kv. 18, Fryazino Moskovskoi oblasti; Elizaveta Ivanovna Koryagina, ulitsa Oktyabrskaya 15, kv. 31, Lytkarino Moskovskoi oblasti; Valery Borisovich Kravchenko, ulitsa Lenina 14, kv. 47, Fryazino Moskovskoi oblasti; Jury Petrovich Rudnitsky, ulitsa Ostrovityanova 31, kv. 298, Moscow; Valentin Pavlovich Gapontsev, ulitsa Godovikova 1, kv. 110, Moscow; Vadim Vasilievich Tsapkin, Tatarskaya ulitsa 4, kv. 14, Moscow, all of U.S.S.R.

[22] Filed: Apr. 9, 1973

[21] Appl. No.: 349,669

[52] U.S. Cl. .................. 252/301.6 P; 106/47 Q; 331/94.5 E; 252/301.4 P
[51] Int. Cl.² ............... C09K 11/10; C09K 11/08; C09K 11/42; C03C 3/00
[58] Field of Search ............. 106/47 Q, 47 R, 52; 252/301.4 R, 301.4 P, 301.4 F, 301.6 P; 331/94.5 E

[56] References Cited
UNITED STATES PATENTS

| 2,920,972 | 1/1960 | Godron ........................ 106/47 R |
| 2,996,391 | 8/1961 | Weissenberg et al. ........ 106/47 Q |
| 3,068,108 | 12/1962 | Giffchen ...................... 106/47 Q |
| 3,250,721 | 5/1966 | De Paolis et al. ............ 106/47 R |
| 3,328,181 | 6/1967 | Weidel ......................... 106/47 R |
| 3,455,707 | 7/1969 | Jahn ............................. 106/47 Q |
| 3,469,729 | 9/1969 | Grekila et al. ............... 106/47 R |
| 3,549,554 | 12/1970 | Hirayama et al. ............ 106/47 R |
| 3,580,859 | 5/1971 | Buzhinsky et al. .......... 252/301.4 P |
| 3,663,474 | 5/1972 | Lee et al. ..................... 106/52 |
| 3,846,142 | 11/1974 | Buzhinsky et al. .......... 106/47 Q |

FOREIGN PATENTS OR APPLICATIONS

| 2,003,759 | 11/1969 | France |
| 4,533,784 | 10/1970 | Japan .......................... 106/52 |

OTHER PUBLICATIONS

Deutschbein et al. Rev. Pays. Appl. 2 (1) Mar. 1967 "Les Verres Phosphates, Nouveaux Materiaux Laser" pp. 29-37 QC1R47.
Takahashi, K., Adv. Inglass Technology 1962 Plenum Press, NYC "Binary Phosphate, Silico Phosphate, Borophosphate etc." pp. 366-376.
Kirk–Othmer–Encyclopedia of Chemical Technology vol. 22, p. 653.

Primary Examiner—Patrick P. Garvin
Assistant Examiner—Mark Bell
Attorney, Agent, or Firm—Haseltine, Lake & Waters

[57] ABSTRACT

Glass for laser use, comprising the oxides of the following elements having the following mol percentage composition:

| | |
|---|---|
| phosphorus pentoxide | 35–49; |
| oxides of one or more alkali metals | 1–30; |
| oxides of one or more metals of group II | 20–45; |
| oxides of one or more rare-earth elements | 0.1–25; |
| oxides of one or more of B, Al, Nb, Pb | 0–27; | wherein the ratio of the sum total of the oxides of mono-, bi- and trivalent metals to the phosphorus pentoxide exceeds unity.

6 Claims, No Drawings

PHOSPHATE GLASS FOR LASER USE

This invention relates to glass used in quantum electronics and adapted for generation and amplification of an induced radiation within a wavelength of 1060 nm and has particular reference to glass for laser use.

A known glass for laser use, comprises $P_2O_5$, oxides of alkali metals, compounds of rare-earth elements and compounds of the elements belonging to the group of Al, Zn, Nb, B.

One of such phosphate glasses is the glass having the following weight percent composition:

| | |
|---|---|
| $Li_2O$ | 2–40 |
| $Na_2O$ | 2–40 |
| $P_2O_5$ | 30–90 |
| $Al_2O_3$ | 0–5 | activated by neodymium or some other rare-earth elements (cf., e.g., British Pat. No. 1,177,731, Cl. IPC CO9 k 1/36, Brit. Cl. C4S).

Such types of glass belong to the group discussed in the treatise by O. K. Deutschbein, C. C. Partrat, I. N. Cverchevsky, Rev. Phys. Appl., 2, No. 1, pp. 29–37, 1967, wherein the spectral-luminescent properties of the following series of neodymium-activated glass are examined:

a. $P_2O_5 + x_2O$, where $x$ = Li, Na, K, Rb;
b. $P_2O_5 + yO$, where $y$ stands for the metals of group II of the Periodic System and Pb;
c. $P_2O_5 \cdot Al_2O_3 \cdot x_2O$, where $x$ = Na, K, Rb;
d. $k(P_2O_5 + x_2O) + (1-k)(P_2O_5 + yO)$, where $1 > k > 0$.

Also known at present is a metaphosphate-composition glass (cf., e.g., U.S. Pat. No. 3,250721, Cl.252-301,4), comprising the following components (in wt.%):

| | |
|---|---|
| $La_2O_3$ | 14 |
| BaO | 23 |
| $P_2O_5$ | 60 |
| $Nd_2O_3$ | 3.0 |

The afore-discussed types of glass find application in a number of laser systems; however, they suffer from some substantial disadvantages.

These types of glass are of low chemical stability, especially when exposed to a humid atmosphere and weak-acid medium. Said compositions fail to produce glass possessing a predetermined positive, zero-approximating or negative temperature-dependent variation of the refractive index which is of urgent necessity for establishing laser devices with low divergence of coherent radiation.

The above-stated glass compositions fail to provide the possibility of controlling the laser parameters of neodymium, viz., cross-sectional area of induced radiation, width of generation spectrum, radiation wavelength.

It is an essential object of the present invention to provide a glass composition for laser use that would provide high chemical stability of the glass, the range of the temperature-dependent variations of the refractive index within $-60 \cdot 10^{-7}$ to $+60 \cdot 10^{-7}$ (1/deg.), including zero-approximating values, good technological characteristics and high laser parameters, viz., maximum inactive losses of $2 \cdot 10^{-3}$ cm$^{-1}$ and efficiency of a laser with a cylindrical active element having a diameter of 20 mm and a height of 260 mm, equal to at least 3 percent of the electrical power supplied to the pumping lamps, with optimum resonators and pumping system.

Said and other objects are achieved due to the fact that the glass for laser use, comprising $P_2O_5$, oxides of alkali metals, compounds of rare-earth elements, compounds of the elements from the group consisting of Al, Zn, Nb, B, according to the invention apart from the afore-mentioned components incorporates also compounds of Mg, Ca, Sr, Ba, Cd and Pb taken either separately or in combination, all the abovesaid components being taken in the following mol percentage: $P_2O_5$, 35–49 (30–80wt.%); oxides of alkali metals, 1–30 (0.3–45 wt.%); oxides of the metals of group II, 20–45 (18–50 wt.%); compounds of rare-earth elements, 0.1–25 (0.2–40 wt.%); compounds of B, Al, Nb, Pb, 0–27 (0–35 wt.%), the ratio of the sum total of the moles of the mono-, bi-and trivalent metals to phosphorus pentoxide exceeding unity.

It is expedient to additionally incorporate $ZrO_2$ and/or $Cr_2O_3$ in an amount of 0.01–10 mol percent.

The glass for laser use may have the following mol precentage composition:

| | |
|---|---|
| $P_2O_5$ | 40–49 |
| BaO | 10–40 |
| $K_2O$ | 1–25 |
| $Al_2O_3$ | 2–7 |
| $Yb_2O_3$ | 6–10 |
| $Er_2O_3$ | 0.02–0.5. |

The glass for laser use may also have the following mol percentage composition:

| | |
|---|---|
| $P_2O_5$ | 38–49 |
| BaO | 10–30 |
| CdO | 5–35 |
| $K_2O$ | 5–25 |
| $Al_2O_3$ | 1–10 |
| $Nd_2O_3$ | 0.5–5. |

The glass for laser use is expedient to have the following mol percentage composition:

| | |
|---|---|
| $P_2O_5$ | 39–49 |
| BaO | 5–35 |
| ZnO | 10–30 |
| $B_2O_3$ | 0–10 |
| $Nd_2O_3$ | 0.5–6 |
| $Na_2O$ | 1–5. |

All the components of the afore-stated glass compositions are taken in the following mol percent ratios:
 phosphorus pentoxide — 35–49;
 oxides of alkali metals — 1–30;
 oxides of the metals of group II — 20–45;
 compounds of rare-earth elements — 0.1–25;
 compounds of B, Al, Nb, Pb — 0–27;
the ratio of the sum total of the oxides of mono-, bi- and trivalent metals to phosphorus pentoxide exceeding unity.

To obtain generation within other wavelengths, $Nd_2O_3$ may be replaced by $Yb_2O_3$ (4–10 percent) in combination with one of the oxides $Er_2O_3$, $Tm_2O_3$, $Ho_2O_3$ (0.025–0.5 percent).

The proposed composition makes it possible to produce glass possessing high chemical stability, viz., its stability as against the Standard D1 No. 12111 corresponds to the IInd hydrolytic class, as well as thermal refractive index coefficient (temperature-dependent variation of refractive index) ranging within $-60.10^{-7}$ (1/deg.) to $+60.10^{-7}$ (1/deg.), which is indispensable in constructing low angular divergence lasers.

Also contributing to the advantageous features of the proposed glass is the uniform distribution of neodymium ions in the glass matrix which, along with low inactive absorption with respect to generation wavelength, is responsible for the high efficiency of laser.

The herein-proposed composition of glass makes possible the variation of the cross-sectional area of an induced radiation of $Nd^{3+}$ and the width of the laser generation spectrum. Thus, the glass containing mostly oxides of metals possessing large ionic radii ($Rb^{1+}$, $Ba^{2+}$, $Pb^{2+}$), has a large cross-sectional area of radiation amounting to $5.10^{-20}$ cm$^2$ and produces a narrow-band (less than 10 A in a spherical cavity) coherent radiation spectrum. Alternatively, the glass containing mostly oxides of metals possessing small ionic radii ($Li^{1+}$, $Mg^{2+}$, $Ca^{2+}$) has a small cross-sectional area of stimulated radiation of $Nd^{3+}$ of about $1.10^{-20}$ cm$^2$ and produces a broad-band (up to 100 A in a spherical cavity) coherent radiation spectrum.

Shifting of the generation wavelength towards the shorter range (to 1046 nm) is attained by increasing the mol percentage of Al in the glass.

Given below is a detailed disclosure of the invention illustrated by a specific glass composition.

The proposed glass is produced by a conventional technique incorporating the following operations: batch mixing, batch fusion, glass melting (including glass refining) with subsequent annealing of the glass melt. The batch melting temperature is within 950°–1300°C and the glass melt annealing temperature is within 300°–500°C.

The batch is prepared by mixing the components taken in the proportions required to obtain the glass of the desired composition. As starting materials for batch mixing one may use phosphorus pentoxide or orthophosphoric acid, oxides, carbonates and nitrates of alkali metals, phosphorated salts of alkali-earth metals and oxides of B, Al, Zr, Nb, Pb. However, from the viewpoint of better process technique, it is more advantageous to make use of the ready phosphates of both alkali-earth and other of the above-listed metals (viz., ortho-, pyro- and metaphosphates).

The glass mol percentage composition calculated as oxides is as follows: $P_2O_5$ — 35–49; oxides of alkali metals — 1–30; oxides of alkaline earth metals — 20–45; compounds of rare-earth elements — 0.1–25; compounds of B, Al, Nb, Pb — 0–10; the ratio of the sum total of the oxides of mono-, bi- and trivalent metals to phosphorus pentoxide exceeding unity.

Trivalent ions of rare-earth elements may be introduced into the batch as oxides, fluorides, phosphates, nitrates or some other compounds capable of establishing neutral or oxidizing conditions so as to avoid transition of rare-earth elements into lower valence conditions.

In some cases it is expedient to introduce into the glass composition $ZrO_2$ and/or $Cr_2O_3$ in amounts of 0.01–10 mol.%.

Given below are the compositions of the starting batch and the compositions of the glass obtained (in mol percent).

EXAMPLE 1

The batch is prepared from 53.7 g $Ba(PO_3)_2$; 32.6 g $KPO_3$; 8.80 g $AlPO_4$; and 4.90 g $Nd_2O_3$.

The resultant glass has the following composition (in mol.%):

| | |
|---|---|
| $P_2O_5$ | 49.0 |
| BaO | 25.0 |
| $K_2O$ | 19.0 |
| $Al_2O_3$ | 5.0 |
| $Nd_2O_3$ | 2.0 |

The glass melting temperature is 1200°C; the thermal expansion coefficient, $170.10^{-7}$ (1/deg.); microhardness, 300 kg/mm$^2$; temperature-dependent optical constant, $-30.10^{-7}$ (1/deg.); generation wavelength, 1056 nm; cross-sectional area of stimulated radiation, $4.0.10^{-20}$ cm$^2$.

EXAMPLE 2

The batch is prepared from 35.4 g $Ba(PO_3)_2$; 31.8 g $KPO_3$; 26.3 g $Cd(PO_3)_2$; 4.0 g $Al_2O_3$; and 2.5 g $Nd_2O_3$, to obtain the glass of the following mol-percentage composition:

| | |
|---|---|
| $P_2O_5$ | 47.0 |
| BaO | 16.0 |
| $K_2O$ | 18.0 |
| CdO | 13.0 |
| $Al_2O_3$ | 5.0 |
| $Nd_2O_3$ | 1.0 |

The glass melting temperature is 1300°C; the thermal expansion coefficient, $130.10^{-7}$ (1/deg.); temperature-dependent optical constant, $2.10^{-7}$ (1/deg.); generation wavelength, 1054 nm, cross-sectional area of stimulated radiation, $2.8.10^{-20}$ cm$^2$.

EXAMPLE 3

The batch is prepared from 80 g $H_3PO_4$ (87 percent); 32.6 g $BaCO_3$; 13.4 g ZnO; 2.1 g $B_2O_3$; 0.985 g $NaCO_3$; and 7.5 g $Nd_2O_3$ to obtain the glass of the following mol-percentage composition:

| | |
|---|---|
| $P_2O_5$ | 48.0 |
| BaO | 22.0 |
| ZnO | 22.0 |
| $B_2O_3$ | 4.0 |
| $Na_2O$ | 1.0 |
| $Nd_2O_3$ | 3.0 |

The glass melting temperature is 1300°C; thermal expansion coefficient, $140.10^{-7}$ (1/deg.); temperature dependent optical constant, $+20.10^{-7}$ (1/deg.); laser emission wavelength, 1056 nm; cross-sectional area of stimulated radiation, $2.5.10^{-20}$ cm$^2$.

EXAMPLE 4

The batch is prepared from 38.9 g $Ba(PO_3)_2$; 34.4 g $Zn(PO_3)_2$; 7.5 g $BPO_4$; 1.5 g $NaPO_3$; 16.6 g $Yb_2O_3$; and 1.1 g $TmO_3$ to obtain the glass of the following mol-percentage composition:

| | |
|---|---|
| $P_2O_5$ | 46.8 |
| BaO | 18.8 |
| ZnO | 22.0 |
| $B_2O_3$ | 5.0 |
| $Na_2O$ | 1.0 |
| $Yb_2O_3$ | 6.0 |
| $Tm_2O_3$ | 0.4 |

The glass melting temperature is 1200°C; thermal expansion coefficient, $100.10^{-7}$ (1/deg.); microhardness, 450 kg/mm²; laser emission length, 1800 hm.

EXAMPLE 5

The batch is prepared from 46.6 g $Ba(PO_3)_2$; 40.4 g $Pb(PO_3)_2$; 3.90 g $H_3BO_3$; 2.64 g $K_2CO_3$; 6.40 g $Nd_2O_3$; and 2.60 g $Al_2O_3$ to obtain the glass of the following mol-percentage composition:

| | |
|---|---|
| $P_2O_5$ | 42.5 |
| BaO | 25.0 |
| PbO | 17.5 |
| $K_2O$ | 3.0 |
| $Al_2O_3$ | 4.0 |
| $B_2O_3$ | 5.0 |
| $Nd_2O_3$ | 3.0 |

The glass melting temperature is 1200°C; thermal expansion coefficient, $120.10^{-7}$ (1/deg.); microhardness, 450 kg/mm²; laser emission wavelength, 1054 nm; cross-sectional area of stimulated radiation, $3.0.10^{-20}$ cm².

EXAMPLE 6

The batch is prepared from 48.0 g $Cd(PO_3)_2$; 26.1 g $Sr(PO_3)_2$; 13.3 g $La(PO_3)_3$; 4.33 g $Na_2CO_3$; 5.7 g $Nb_2O_5$; and 4.65 g $Nd_2O_3$ to obtain the glass of the following mol-percentage composition:

$P_2O_5$ — 47.50

| | |
|---|---|
| CdO | 25.00 |
| SrO | 15.00 |
| $La_2O_3$ | 2.50 |
| $Na_2O$ | 5.00 |
| $Nb_2O_5$ | 3.00 |
| $Nd_2O_3$ | 1.95 |
| $Cr_2O_3$ | 0.05 |

The glass melting temperature is 1300°C, thermal expansion coefficient, $90.10^{-7}$ (1/deg.); microhardness, 500 kg/mm².

EXAMPLE 7

The batch is prepared from 65.2 g $Ca(PO_3)_2$; 11.8 g $Mg(PO_3)_2$; 9.43 g $NaPO_3$; 7.3 g $Nb_2O_5$; 6.2 g $Nd_2O_3$; and 0.07 g $Cr_2O_3$ to obtain the glass of the following mol-percentage composition:

| | |
|---|---|
| $P_2O_5$ | 48.5 |
| CaO | 35.45 |
| MgO | 7.0 |
| $Na_2O$ | 5.0 |
| $Nb_2O_5$ | 3.0 |
| $Nd_2O_3$ | 2.0 |
| $Cr_2O_3$ | 0.05 |

The glass melting temperature is 1300°C; thermal expansion coefficient, $105.10^{-7}$ (1/deg.); microhardness, 530 kg/mm²; laser emission wavelength, 1053 nm; cross-sectional area of stimulated radiation, $1.8.10^{-20}$ cm².

EXAMPLE 8

The batch is prepared from 58.6 g $Ba(PO_3)_2$; 11.1 g $LiPO_3$; 8.5 g $Al(PO_3)_3$; 20.2 g $Yb_2O_3$; and 0.5 g $Er_2O_3$ to obtain the glass of the following mol-percentage composition:

| | |
|---|---|
| $P_2O_5$ | 48.4 |
| BaO | 30.9 |
| $Li_2O$ | 10.0 |
| $Al_2O_3$ | 2.5 |
| $Yb_2O_3$ | 8.0 |
| $Er_2O_3$ | 0.2 |

The glass melting temperature is 1200°C; thermal expansion coefficient, $120.10^{-7}$ (1/deg.); microhardness, 400 kg/mm²; laser emission wavelength, 1.54 nm.

EXAMPLE 9

The batch is prepared from 72.80 g $Zn(PO_3)_2$; 14.5 g $Pb(PO_3)_2$; 2.9 g $Mg(PO_3)_2$; 3.94 g $Na_2CO_3$; 1.1 g $ZrO_2$; 3.7 g $Nd_2O_3$; and 3.8 g $Eu_2O_3$ to obtain the glass of the following mol-percentage composition:

| | |
|---|---|
| $P_2O_5$ | 46.00 |
| ZnO | 39.00 |
| PbO | 5.00 |
| MgO | 2.00 |
| $ZrO_2$ | 1.20 |
| $Na_2O$ | 4.00 |
| $Nd_2O_3$ | 1.4 |
| $Eu_2O_3$ | 1.4 |

The glass melting temperature is 1200°C, thermal expansion coefficient, $115.10^{-7}$ (1/deg.); microhardness, 400 kg/mm²; laser emission wavelength, 10540 nm, cross-sectional area of stimulated radiation, $2.5.10^{-20}$ cm².

EXAMPLE 10

The batch is prepared from 39.5 g $Ba(PO_3)_2$; 22.7 g $KPO_3$; 17.3 g $Cd(PO_3)_2$; 20.0 g $Yb_2O_3$; and 0.48 g $Ho_2O_3$ to obtain the glass of the following mol-percentage composition:

| | |
|---|---|
| $P_2O_5$ | 45.9 |
| BaO | 20.9 |
| $K_2O$ | 15.0 |
| CdO | 10.0 |
| $Yb_2O_3$ | 8.0 |
| $Ho_2O_3$ | 0.2 |

What is claimed is:

1. A glass for laser use having the following mol percentage composition:
phosphorus pentoxide — 35–49;
oxides of one or more alkali metals — 1–30;
oxides of one or more metals of group II — 20–45;
neodymium oxide — 0.1–25;
oxides of elements selected from the group consisting of B, Al, Nb and Pb — 0–27;
the ratio of the sum total of the oxides of mono-, bi- and trivalent metals to the phosphorus pentoxide being in excess of unity, said glass having a thermal refractive index coefficient of $(-30$ to $+20) \cdot 10^{-7}$ deg$^{-1}$ and a cross-sectional area of stimulated radiation of $1 \cdot 10^{-20}$ to $5 \cdot 10^{-20}$ cm$^2$.

2. A glass as claimed in claim 1, also doped with the oxides of metals selected from the group consisting of $ZrO_2$ and $Cr_2O_3$ in an amount of 0.01–10 mol percent.

3. A glass as claimed in claim 1, comprising the following components (in mol percent):

| | |
|---|---|
| $P_2O_5$ | 38–49 |
| BaO | 10–30 |
| CdO | 5–35 |
| $K_2O$ | 5–25 |
| $Al_2O_3$ | 1–10 |
| $Nd_2O_3$ | 0.5–5 |

4. A glass as claimed in claim 1, comprising the following components (in mol percent):

| | |
|---|---|
| $P_2O_5$ | 39–49 |
| BaO | 5–35 |
| ZnO | 10–30 |
| $B_2O_3$ | 0–10 |
| $Nd_2O_3$ | 0.5–6 |
| $Na_2O$ | 1–5 |

5. A glass according to claim 1 which has said area in the range of $1.8 \cdot 10^{-20}$ to $4.0 \cdot 10^{-20}$ cm$^2$.

6. A glass according to claim 1 which has a thermal expansion coefficient of $120 \cdot 10^{-7}$ to $170 \cdot 10^{-7}$ deg$^{-1}$.

* * * * *